United States Patent
Padmanabhan et al.

(10) Patent No.: US 12,124,759 B2
(45) Date of Patent: Oct. 22, 2024

(54) HARDWARE ARCHITECTURE FOR MULTI-DISPLAY VIDEO SYNCHRONIZATION

(71) Applicant: Intel Corporation, Santa Clara, CA (US)

(72) Inventors: Aswin Padmanabhan, San Jose, CA (US); Sangeeta Ghangam Manepalli, Chandler, AZ (US); Kiran K. Velicheti, Chandler, AZ (US); Robert James Johnston, Chico, CA (US); Chandra Konduru, Folsom, CA (US); Todd M. Witter, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 17/481,572

(22) Filed: Sep. 22, 2021

(65) Prior Publication Data
US 2022/0004351 A1    Jan. 6, 2022

Related U.S. Application Data

(60) Provisional application No. 63/083,897, filed on Sep. 26, 2020.

(51) Int. Cl.
*G06F 3/14*    (2006.01)

(52) U.S. Cl.
CPC ................... *G06F 3/1446* (2013.01)

(58) Field of Classification Search
None
See application file for complete search history.

(56) References Cited

U.S. PATENT DOCUMENTS

| | | | | |
|---|---|---|---|---|
| 7,483,031 B2 * | 1/2009 | Williams | ............. | H04N 13/398 345/503 |
| 7,499,044 B2 * | 3/2009 | Kennedy | ............... | G06F 3/1423 327/39 |
| 8,537,166 B1 * | 9/2013 | Diard | .................... | G06T 3/4038 345/1.3 |

(Continued)

FOREIGN PATENT DOCUMENTS

| | | | | |
|---|---|---|---|---|
| CN | 1750109 A | * | 3/2006 | |
| FR | 2964235 A1 | * | 3/2012 | ........... G06F 3/1438 |

OTHER PUBLICATIONS

Nvidia, "Quadro Sync, User's Guide," DU-06574-001_V01, Oct. 2012 (36 pages).

*Primary Examiner* — Clayton R Williams
(74) *Attorney, Agent, or Firm* — Alliance IP, LLC

(57) ABSTRACT

In one embodiment, a processing device includes a plurality of display interfaces, a plurality of display controllers, and display synchronization circuitry. The display interfaces are used to interface with a plurality of display devices, and the display controllers are used to output video frames to the display devices via the display interfaces. Moreover, the display synchronization circuitry includes a clock synchronization interface and a frame synchronization interface. The clock synchronization interface is used to synchronize a clock rate across the display controllers, while the frame synchronization interface is used to synchronize a frame rate across the display controllers.

25 Claims, 12 Drawing Sheets

(56) References Cited

U.S. PATENT DOCUMENTS

| | | | | |
|---|---|---|---|---|
| 2002/0175924 A1* | 11/2002 | Yui | ............................ | G06F 3/14 |
| | | | | 345/660 |
| 2009/0237560 A1* | 9/2009 | Ganzaroli | ................ | H04N 9/12 |
| | | | | 348/E5.009 |
| 2010/0111491 A1* | 5/2010 | Kamoto | .................. | H04N 5/073 |
| | | | | 386/207 |
| 2011/0043514 A1* | 2/2011 | Hussain | ................... | G09G 5/18 |
| | | | | 345/213 |

* cited by examiner

HARDWARE ARCHITECTURE FOR MULTI-DISPLAY VIDEO SYNCHRONIZATION

CROSS-REFERENCE TO RELATED APPLICATION

This patent application claims the benefit of the filing date of U.S. Provisional Patent Application Ser. No. 63/083,897, filed on Sep. 26, 2020, and entitled "HARDWARE-BASED VIDEO SYNCHRONIZATION ACROSS MULTIPLE PROCESSING DEVICES," the contents of which are hereby expressly incorporated by reference.

FIELD OF THE SPECIFICATION

This disclosure relates in general to the field of video processing and playback, and more particularly, though not exclusively, to hardware-based video synchronization across multiple displays.

BACKGROUND

Digital signage for displaying video content, such as video advertisements, is often implemented as a video wall. A video wall typically includes a collection of display devices that each display a different portion of the overall video content. The video content is collectively generated by one or more computing devices, each of which generates video content for one or more of the displays. Moreover, the video content must be synchronized across all of the displays. Otherwise, it may appear distorted or out of sync to a human observer, which negatively impacts the user experience. It can be challenging, however, to synchronize video content across multiple displays with a high degree of precision, particularly for video walls implemented across numerous displays and associated computing devices.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
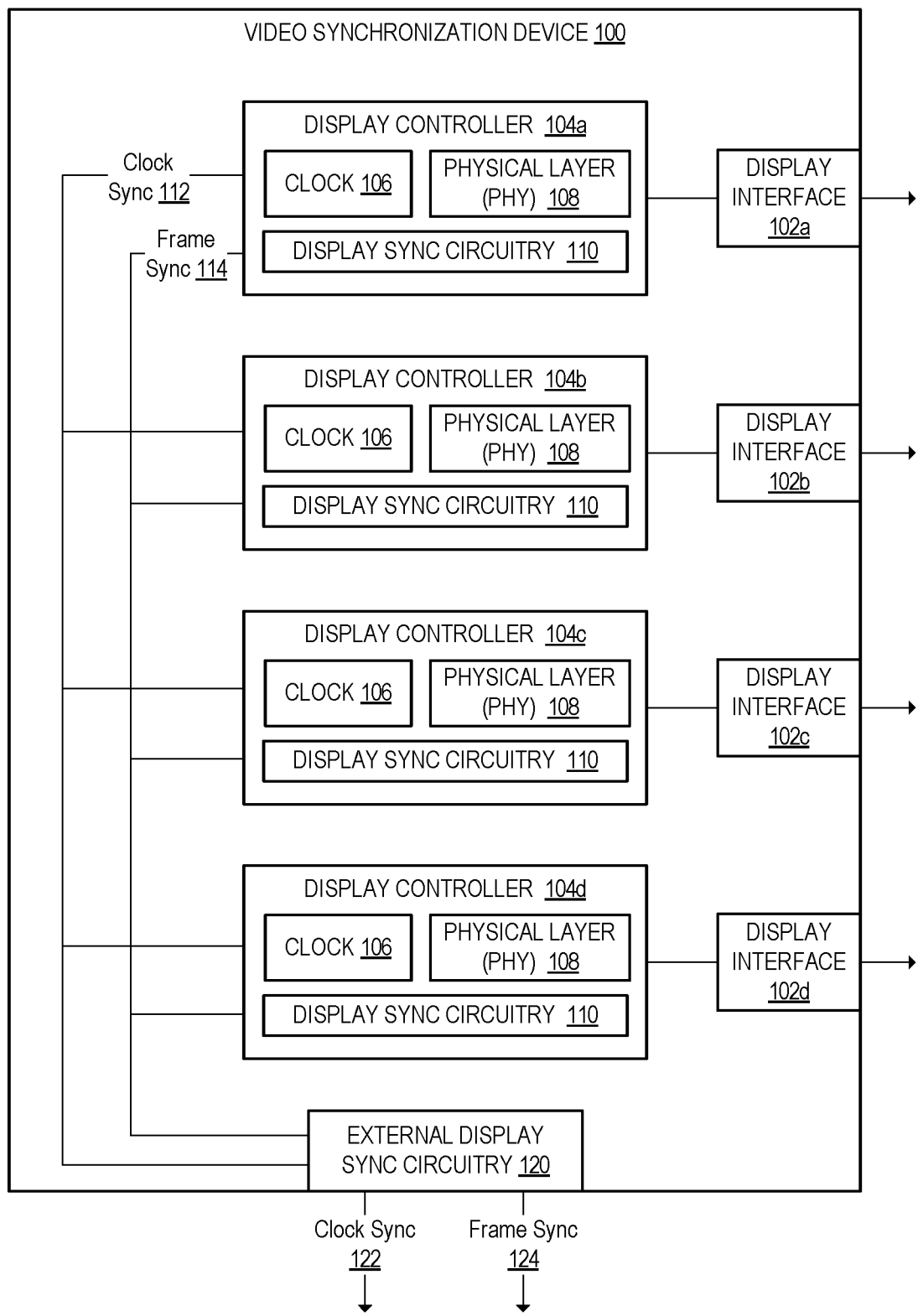
FIG. 1 illustrates an example of a video synchronization device in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Hardware Architecture for Multi-Display Video Synchronization

Video walls and other types of multi-display digital signage are used to present unified visual content across multiple synchronized displays—such as video advertisements—and are being increasingly used in public spaces, such as retail establishments, airports, and so forth. A video wall typically includes an arrangement of multiple displays (e.g., televisions, monitors, displays, screens), each of which displays a different portion of the overall video content. For example, the displays may be tiled together to form one large screen, or the displays may be arranged in a creative or artistic manner.

Moreover, the video content displayed on a video wall must be synchronized across all displays; otherwise, the video content will appear distorted or out of sync to a human observer, which negatively impacts the user experience. The degree of precision required for the synchronization in a video wall (e.g., the latency between content displayed on different screens) is typically driven by customer requirements and may vary for different use cases and configurations. For example, some use cases may require the displays in a video wall to be synchronized within 1-2 milliseconds (ms), while others may have a target of +−20 parts per million (ppm) across the displays/systems, which equates to less than 7 microseconds (µs) for video with 4K resolution @ 60 frames per second (fps).

Accordingly, this disclosure presents embodiments of a hardware architecture that can be used to synchronize video—with a high degree of accuracy—across multiple displays controlled by one or multiple video processing devices.

FIG. 1 illustrates an example of a video synchronization device 100 in accordance with certain embodiments. In the illustrated embodiment, the video synchronization device 100 may be used to synchronize video or other media content across multiple display devices, which may be configured as part of a video wall, as described further below. In some cases, this type of synchronization may be referred to as generator locking (genlock). For example, while genlock typically refers to generator locking using an external clock source, in the context of this disclosure, synchronization using one of the system clock sources as the main clock source is also referred to as genlock.

In the illustrated embodiment, the video synchronization device 100 includes four display interfaces 102a-d and four corresponding display controllers 104a-d. The display interfaces 102a-d are used to interface with four corresponding display devices (not shown), which may be part of a video wall. Moreover, the display interfaces 102a-d may include any suitable type of display interface, such as high-definition multimedia interface (HDMI) interfaces, DisplayPort (DP) interfaces, type-C interfaces, and/or video graphics array (VGA) interfaces, among other examples.

Moreover, the display controllers 104a-d are used to output video frames via the display interfaces 102a-d to the corresponding display devices. In particular, each display controller 104a-d may control one of the display interfaces 102a-d. In the illustrated embodiment, each display controller 104a-d includes a clock 106, a physical layer (PHY) controller 108, and internal display synchronization circuitry 110.

The PHY display controller 108 is used to control the physical layer of a corresponding display interface 102a-d. For example, the PHY controller 108 may be an HDMI PHY, DisplayPort PHY, type-C PHY, VGA PHY, and/or any other type of PHY for controlling a particular type of display interface.

Further, the internal display synchronization circuitry 110 is used to synchronize the clock rate and frame rate across the respective display controllers 104a-d of the video synchronization device 100. For example, the internal display synchronization circuitry 110 of each display controller 104a-d is coupled via a clock synchronization interface 112 and a frame synchronization interface 114. Moreover, the display synchronization circuitry 110 enables each display controller 104a-d to be configured as a primary display controller or a secondary display controller. In particular, one of the display controllers 104a may be configured as the primary controller, while the others 104b-d may be configured as secondary controllers.

The primary controller 104a periodically sends a clock synchronization signal to the secondary controllers 104b-d via the clock synchronization interface 112, which enables the clock rate to be synchronized across the respective display controllers 104a-d. For example, upon receiving the clock synchronization signal from the primary controller 104a, the secondary controllers 104b-d synchronize their internal clocks 106b-d with the internal clock 106a of the primary controller 104a.

The primary controller 104a also periodically sends a frame synchronization signal to the secondary display controllers 104b-d via the frame synchronization interface 114, which enables the frame rate to be synchronized across the respective display controllers 104a-d. In particular, the frame synchronization signal—which is aligned with the clock synchronization from the primary controller—causes each display controller 104a-d to simultaneously output a video frame over its corresponding display interface 102a-d to one of the displays.

In some embodiments, for example, the frame synchronization signal may be, or may include, a vertical synchronization (VSync) signal. Moreover, the frame synchronization signal may be sent every time a new set of frames is ready to be displayed across the video wall. In this manner, all of the frames are displayed on the respective displays of the video wall at the same time. An example of this scenario is further shown and described in connection with the video wall system of FIG. 2.

The video synchronization device 100 also includes external display synchronization circuitry 120, which is used to synchronize the clock rate and frame rate across other video synchronization devices. In some embodiments, for example, a video wall may be implemented using multiple video synchronization devices, each of which manages a subset of the displays in the video wall (e.g., a 16-display video wall may be controlled by four video synchronization devices, each of which controls four of the 16 displays). In those embodiments, the external display synchronization circuitry 120 of the video synchronization device 100 can be used to synchronize the clock rate and frame rate across the other video synchronization devices participating in the video wall.

For example, the external display synchronization circuitry 120 includes an external clock synchronization interface 122 and an external frame synchronization interface 124. In this manner, the video synchronization device 100 can also send or receive the clock and frame synchronization signals to or from other external video synchronization devices. Examples of this scenario are further shown and described in connection with the video wall systems of FIGS. 3-5.

While the illustrated embodiment includes a video synchronization device 100 with four display interfaces 102a-d and four display controllers 104a-d to support four display devices (not shown), other embodiments may include any number of display interfaces 102a-d and corresponding display controllers 104a-d to support any number of display devices.

In various embodiments, the video synchronization device 100 may also include a variety of other hardware and/or software components, such as a processor/CPU, GPU, memory, a storage device, communication circuitry (e.g., input/output (I/O) circuitry, network interface controller (NIC) circuitry, antenna(s)), and so forth.

In some embodiments, for example, the video synchronization device 100 may be implemented as a system-on-a-chip (SoC), a discrete graphics card, or a custom ASIC/FPGA video processor, among other examples. For example, an SoC may include a central processing unit (CPU) and an integrated graphics processing unit (GPU), and the integrated GPU may include the display interfaces 102a-d, display controllers 104a-d, and/or internal/external display synchronization circuitry 110, 120. Similarly, a discrete graphics card may include a discrete GPU, and the discrete GPU may include the display interfaces 102a-d, display controllers 104a-d, and/or internal/external display synchronization circuitry 110, 120. Alternatively, a custom ASIC/FPGA video processor may be designed with the display interfaces 102a-d, display controllers 104a-d, and/or internal/external display synchronization circuitry 110, 120.

Moreover, in some embodiments, the video synchronization device 100 may be part of a broader system, such as a digital media player (e.g., video streaming device, disc-based media player as Blu-Ray or DVD), a video game console, an edge server, a display device (e.g., one of the display devices in the video wall, such as a television or monitor with an integrated processing device to participate in the video wall), a video wall controller (e.g., a physical housing, case, or box with one or more video synchronization devices to drive the displays of a video wall), a video wall itself (e.g., a collection of displays and the associated video synchronization devices to drive the displays), among other examples.

As used herein, "display," "display device," "screen," "display screen," "monitor," and "display monitor" have the same meaning and refer to a structure to visibly convey an image, text, and/or other visual content to a human in response to an electrical control signal. As used herein, "a multi-display system" refers to structures that are composed of multiple displays that operate in unison to visibly convey an image, video, text, and/or other visual content to a human in response to an electrical control signal. Moreover, displays may include televisions, monitors, embedded screens, projectors, or any other type of display. Each display may be implemented as a light-emitting diode (LED) display, a liquid crystal display (LCD), a touchscreen, and/or any other suitable type of screen.

Further, in some embodiments, video synchronization device 100 may support a synchronization differential, where video synchronization device 100, certain display controllers of video synchronization device 100, and/or other components of video synchronization device 100 (e.g., sound/audio) are intentionally out-of-sync by a certain differential (e.g., for special effects, surround sound, etc.).

Figure 2:
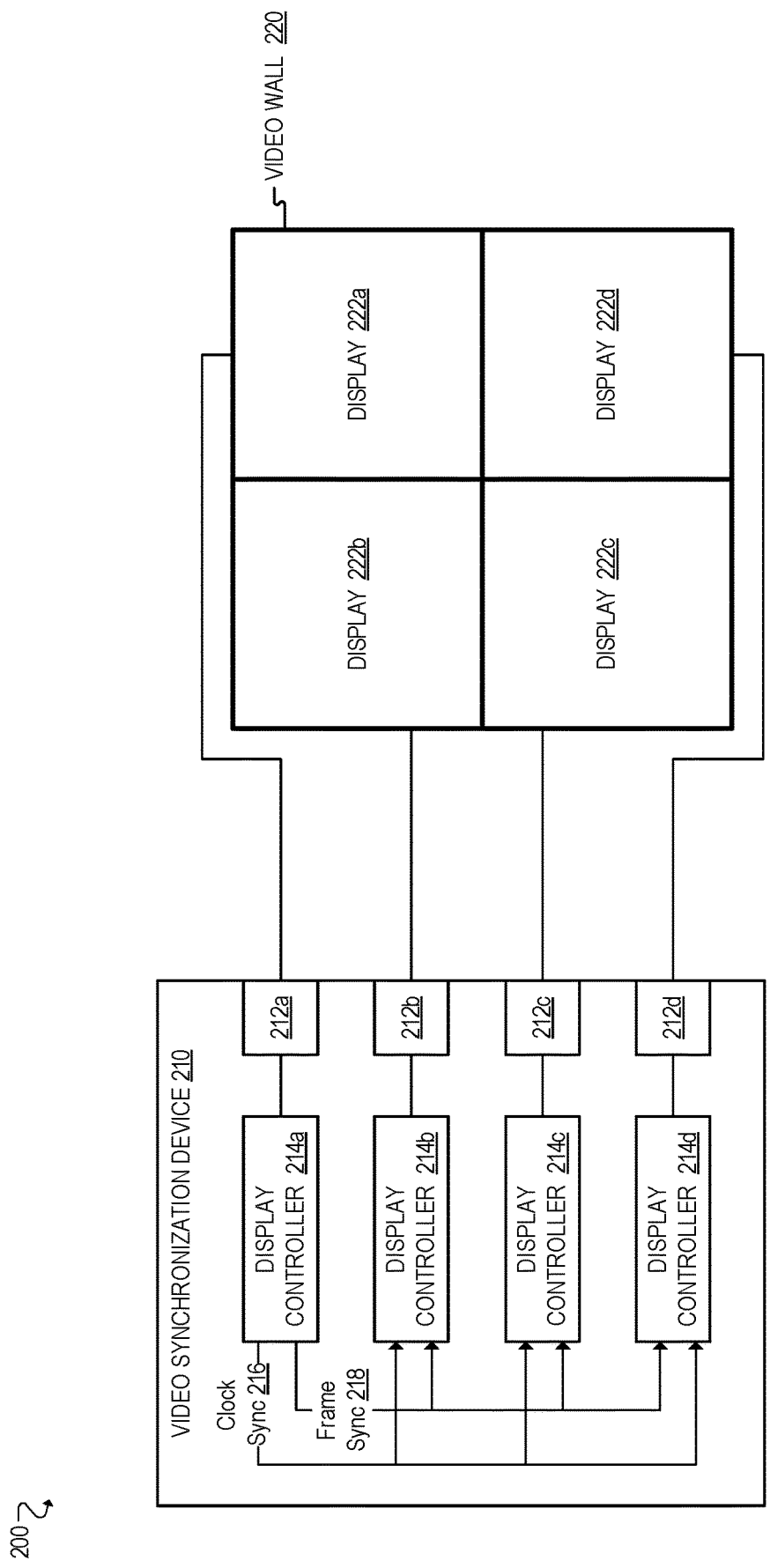
FIG. 2 illustrates an example of a video wall system implemented by a video synchronization device.

FIG. 2 illustrates an example of a video wall system 200 implemented by a video synchronization device 210. In the illustrated example, the video wall system 200 includes a video wall 220 with four displays 222a-d, which are connected to the video synchronization device 210.

In some embodiments, the video synchronization device 210 may include similar components and/or functionality as video synchronization device 100 of FIG. 1. For ease of understanding, however, the video synchronization device 210 is shown to include four display interfaces 212a-d, four display controllers 214a-d, a clock synchronization interface 216, and a frame synchronization interface 218. Each display controller 214a-d manages one of the display interfaces 212a-d, and each display interface 212a-d is connected to one of the display devices 222a-d in the video wall 220.

In the illustrated example, display controller 214a has been configured as the primary display controller and display controllers 214b-d have been configured as secondary display controllers. As a result, the primary display controller 214a periodically sends clock and frame synchronization signals to the secondary display controllers 214b-d via the clock and frame synchronization interfaces 216, 218, which are used to synchronize the clock rate and frame rate across the respective display controllers.

In particular, the primary display controller 214a periodically sends the clock synchronization signal to the secondary display controllers 214b-d to synchronize the clock rate across the respective display controllers 214a-d. For example, upon receiving the clock synchronization signal from the primary display controller 214a, the secondary display controllers 214b-d synchronize their internal clocks with the internal clock of the primary display controller 214a.

Further, the primary display controller 214a periodically sends the frame synchronization signal to the secondary display controllers 214b-d—such as every time a new set of frames is displayed across the video wall 220—to synchronize the frame rate across the respective display controllers 214a-d. For example, in response to the frame synchronization signal, all of the display controllers 214a-d simultaneously output the next set of video frames to the corresponding displays 222a-d in the video wall 220. In particular, the frame synchronization signal—which is aligned with the clock synchronization from the primary controller 214a—causes each display controller 214a-d to output a video frame over its corresponding display interface 212a-d to one of the displays 222a-d. In this manner, all of the frames are displayed on the respective displays 222a-d of the video wall 220 at the same time.

While the illustrated embodiment includes a video synchronization device 210 with four display interfaces 212a-d and four display controllers 214a-d to control a display wall 220 with four display devices 222a-d, other embodiments may include any number of video synchronization devices, display controllers/interfaces per video synchronization device, and/or display devices in the video wall.

Figure 3:
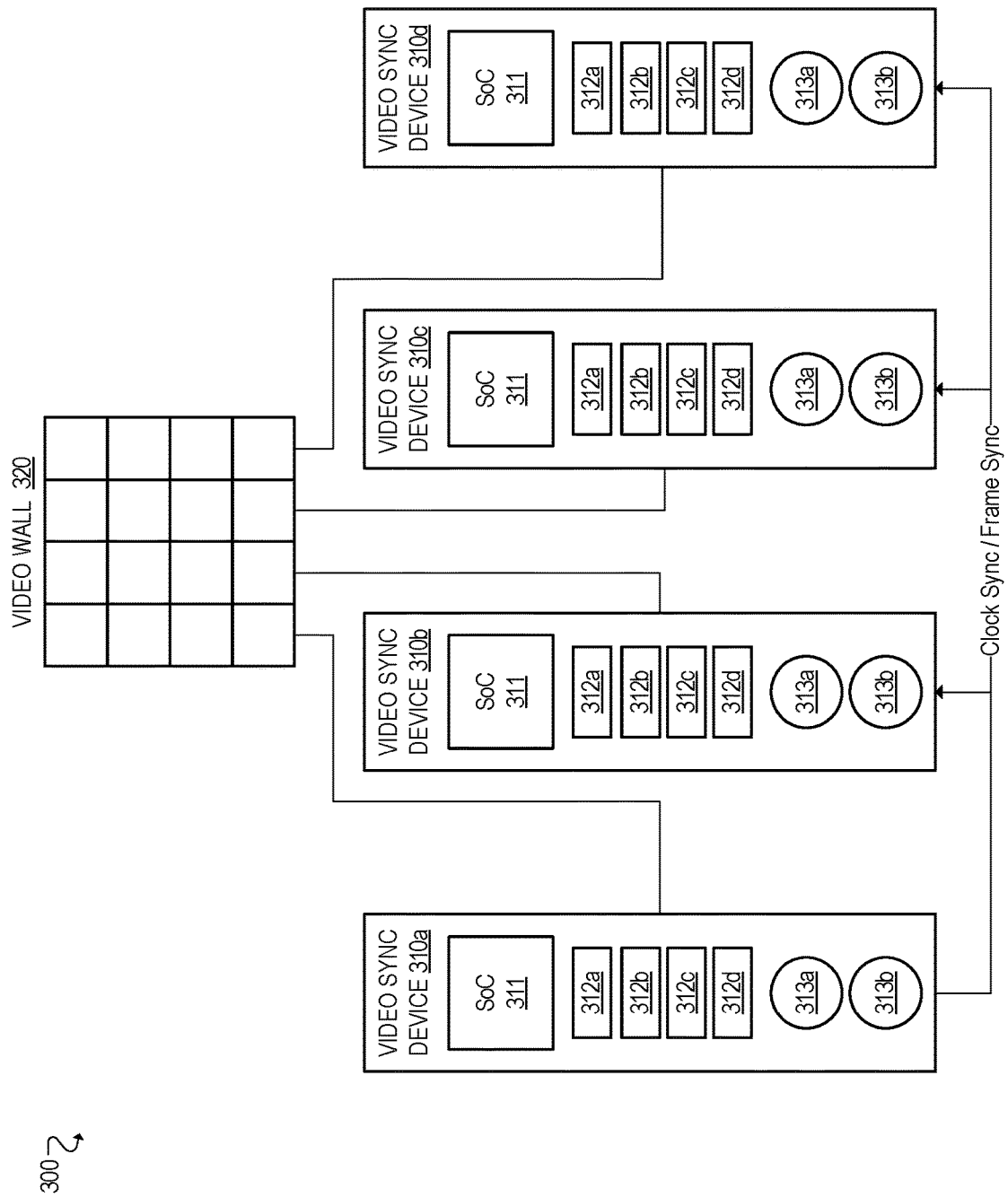
FIG. 3 illustrates an example of a video wall system implemented by multiple video synchronization devices.

FIG. 3 illustrates an example of a video wall system 300 implemented by multiple video synchronization devices. For example, the video wall system 300 includes four video synchronization devices 310a-d, which are collectively used to control a video wall 320 with 16 displays.

In the illustrated example, each video synchronization device 310a-d is shown to include a system-on-a-chip (SoC) 311, four display interfaces 312a-d, and two external display synchronization interfaces 313a,b. In some embodiments, the SoC 311 of each video synchronization device 310a-d includes the functionality and/or components of video synchronization device 100 of FIG. 1, such as display controllers, display synchronization circuitry/interfaces, and so forth. For example, in some embodiments, each SoC 311 includes a central processing unit (CPU), an integrated graphics processing unit (GPU), and a network interface controller (NIC). The integrated GPU may incorporate the functionality and/or components of video synchronization device 100. Moreover, the CPU may be used to coordinate the video content/frames displayed across each display controller/interface 312a-d of the integrated GPU and/or across each video synchronization device 310a-d, and the NIC may be used to send/receive video content to/from the respective devices 310a-d.

Moreover, each video synchronization device 310a-d manages four of the 16 displays in the video wall 320, which are connected to its four display interfaces 312a-d. Internally, the four display interfaces 312a-d are controlled by four corresponding display controllers (not shown).

Further, each video synchronization device 310a-d includes multiple external display synchronization interfaces 313a,b to synchronize the clock/frame rates across the respective video synchronization devices 310a-d. In some embodiments, for example, the external synchronization interfaces 313a,b include two BNC interfaces or ports (with at least two pins each): $BNC_{IN}$ (313a) and $BNC_{OUT}$ (313b). The $BNC_{IN}$ interface 313a is used to receive clock/frame synchronization signals from other video synchronization devices 310a-d, while the $BNC_{OUT}$ interface 313b is used to send clock/frame synchronization signals to other video synchronization devices 310a-d.

For example, to synchronize the clock/frame rates across the respective video synchronization devices 310a-d—and across the display controllers within each video synchronization device 310a-d—one of the video synchronization devices 310a is configured as the primary device, and the remaining video synchronization devices 310b-d are configured as secondary devices. Further, one of the display controllers (not shown) on the primary device 310a is configured as the primary controller, and the remaining display controllers on the primary/secondary devices 310a-d are configured as secondary controllers.

Internally, the primary device 310a synchronizes the clock and frame rates across its own display controllers using the approach shown and described in connection with FIG. 2. For example, the primary controller on the primary device 310a sends clock and frame synchronization signals to the secondary controllers on the primary device 310a via the internal clock and frame synchronization interfaces, which enables the clock and frame rates to be synchronized across the respective display controllers on the primary device 310a.

Externally, the primary device 310a also synchronizes the clock and frame rates across all video synchronization devices 310a-d using the external synchronization interfaces 313a,b. For example, the primary controller on the primary device 310a sends the clock and frame synchronization signals to the secondary devices 310b-d via the external clock and frame synchronization interfaces 313a,b. In particular, the clock/frame synchronization signals are sent from the $BNC_{OUT}$ interface 313b of the primary device 310a to the $BNC_{IN}$ interface 313a of the secondary devices 310b-d. Moreover, upon receiving the external clock and frame synchronization signals from the primary controller on the primary device 310a, the secondary devices 310b-d propagate those synchronization signals to their respective secondary display controllers via their own internal clock and frame synchronization interfaces. In this manner, the clock and frame rates are synchronized across all video synchronization devices 310a-d and their respective display controllers.

In the illustrated embodiment, the video synchronization devices 310a-d are shown as separate devices, which may be contained in different computer appliance housings or boxes. In other embodiments, however, the video synchronization devices 310a-d may be integrated together and/or contained in a common housing or box. For example, in some embodiments, the video synchronization devices 310a-d may be integrated together on a single printed circuit board (PCB) with board traces between the respective devices 310a-d for the external clock/frame synchronization signals (e.g., instead of the external BNC interfaces 313a,b). Moreover, in some embodiments, the video synchronization devices 310a-d—whether physically separate chips or integrated together on a common PCB—may be contained in the same physical housing or box. Alternatively, in some embodiments, the video synchronization devices 310a-d may be integrated within the display devices on the video wall 320. For example, each display device may include an embedded video synchronization device 310, which may include a display controller along with external display synchronization circuitry to synchronize its clock and frame rates with the other embedded video synchronization devices 310 in the other displays in the video wall 320. Moreover, in some embodiments, some or all of the SoCs 311 in the video synchronization devices 310a-d may be implemented by GPUs having similar display synchronization functionality (e.g., as described further in connection with FIG. 4). Further, while the illustrated embodiment includes four video synchronization devices 310a-d—with four display controllers/interfaces 312a-d per device—to control a display wall 320 with 16 display devices, other embodiments may include any number of video synchronization devices, display controllers/interfaces per video synchronization device, and/or display devices in the video wall.

Figure 4:
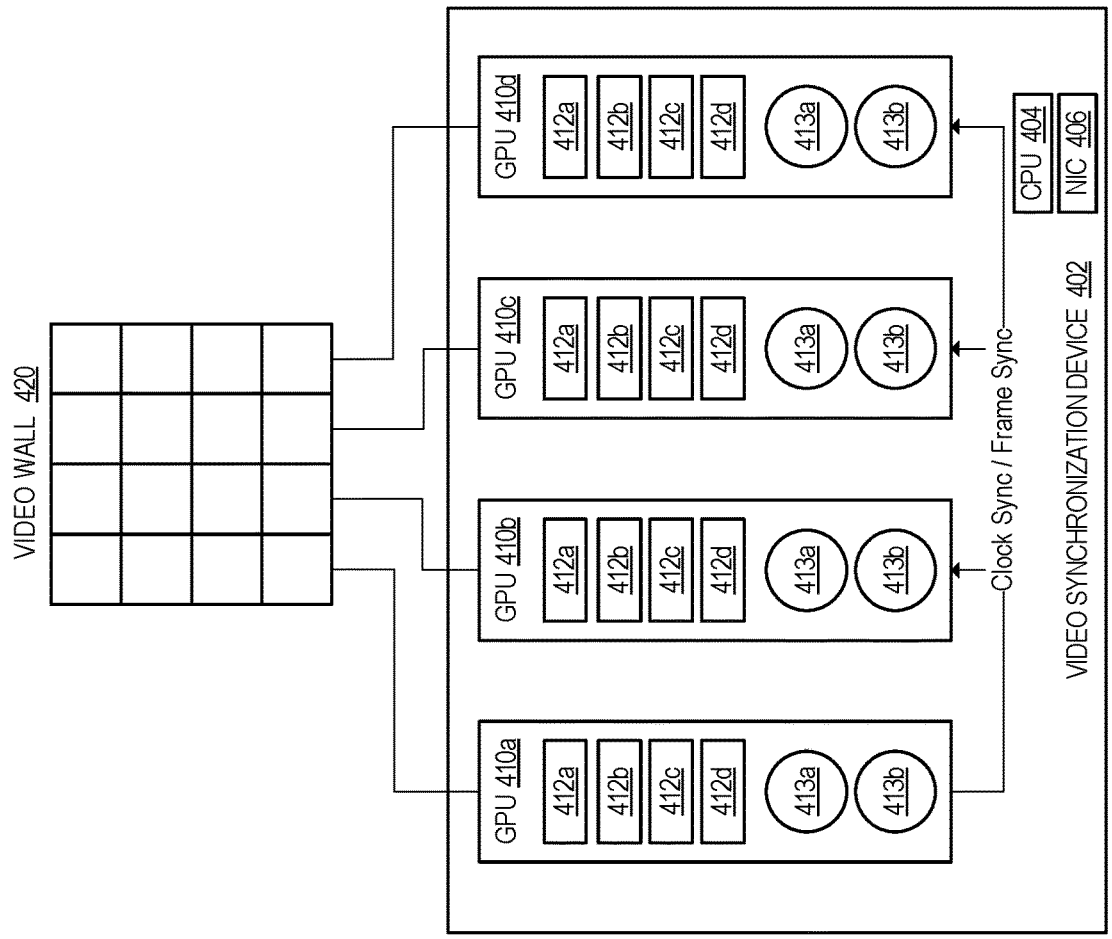
FIG. 4 illustrates an example of a video wall system implemented by a video synchronization device with multiple graphics processing units (GPUs).

FIG. 4 illustrates an example of a video wall system 400 implemented by a video synchronization device with multiple graphics processing units (GPUs). For example, the video wall system 400 includes a video synchronization device 402 with four GPUs 410a-d, which are collectively used to control a video wall 420 with 16 displays.

In the illustrated example, the video synchronization device 402 includes a central processing unit (CPU) 404, a network interface controller (NIC) 406, and four graphics processing units (GPUs) 410a-d (e.g., discrete graphics card with GPUs). The CPU 404 may be used to coordinate the video content/frames displayed across each display controller/interface 412a-d of each GPU 410a-d, and the NIC 406 may be used to send/receive the video content to be displayed using the respective GPUs 410a-d.

Moreover, each GPU 410a-d is shown to include four display interfaces 412a-d and two external display synchronization interfaces 413a,b. In some embodiments, each GPU 410a-d also includes the functionality and/or components of video synchronization device 100 of FIG. 1, such as display controllers, display synchronization circuitry/interfaces, and so forth.

Each GPU 410a-d manages four of the 16 displays in the video wall 420, which are connected to its four display interfaces 412a-d. Internally, the four display interfaces 412a-d are controlled by four corresponding display controllers (not shown).

The clock/frame rates are synchronized across the respective GPUs 410a-d—and across the display controllers within each GPU 410a-d—using the approach described in connection with video wall system 300 of FIG. 3, except the synchronization functionality is implemented by the four GPUs 410a-d within a single video synchronization device 402 rather than the SoCs 311 on four different video synchronization devices 310a-d.

In the illustrated embodiment, the GPUs 410a-d are shown as separate chips in the same video synchronization device 402, which are connected via external BNC interfaces 413a,b and may be contained in a single computer appliance housing or box. In other embodiments, however, the GPUs 410a-d may be integrated together on a printed circuit board (PCB)—within the same video synchronization device 402—with board traces between the respective GPUs 410a-d for the external clock/frame synchronization signals (e.g., instead of separate chips connected via external BNC interfaces 413a,b). Alternatively, in some embodiments, the GPUs 410a-d may be distributed across multiple video synchronization devices 402 in different computer appliance housings or boxes, and the GPUs 410a-d may remain connected via the external BNC interfaces 413a,b. In other embodiments, the GPUs 410a-d may be integrated within the display devices on the video wall 420. For example, each display device may include an embedded GPU 410, which may include a display controller along with external display synchronization circuitry to synchronize its clock and frame rates with the other embedded GPUs 410 in the other displays in the video wall 420. Moreover, in some embodiments, some or all of the GPUs 410a-d may be implemented by SoCs or other integrated circuits having similar display synchronization functionality (e.g., as described further in connection with FIG. 3). Further, while the illustrated embodiment includes four GPUs 410a-d—with four display controllers/interfaces 412a-d per GPU—to control a display wall 420 with 16 display devices, other embodiments may include any number of GPUs, display controllers/interfaces per GPU, and/or display devices in the video wall.

Figure 5:
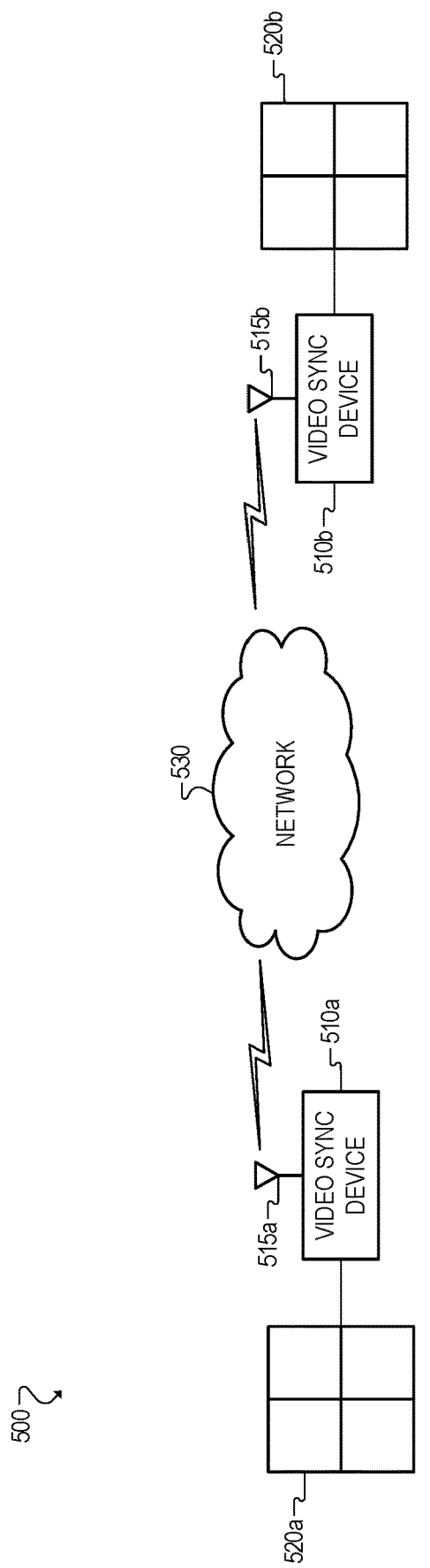
FIG. 5 illustrates an example of a video wall system implemented with multiple video walls.

FIG. 5 illustrates an example of a video wall system 500 implemented with multiple video walls. In the illustrated example, the video wall system 500 includes two video synchronization devices 510a,b, which are respectively used to control two video walls 520a,b with four displays each. In particular, each video synchronization device 510a,b is used to control one of the four-display video walls 520a,b.

In some embodiments, each video synchronization device 510a,b includes the functionality and/or components of video synchronization device 100 of FIG. 1, such as display controllers, display synchronization circuitry/interfaces, and so forth. For example, each video synchronization device 510a,b may include four display interfaces to connect to the four displays in each video wall 520a,b, four display controllers to control the four display interfaces, and display synchronization circuitry to synchronize the clock/frame rates across the four display controllers and/or across the respective video synchronization devices 510a,b.

Moreover, in the illustrated example, each video synchronization device 510a,b also includes an antenna 515a,b to communicate wirelessly over network 530 (e.g., with each other and/or other devices/services). For example, in some use cases, the video walls 520a,b may be physically separate video walls used to display the same video content, such as separate video walls on opposite sides of a large venue (e.g., a stadium or arena). As a result, the video synchronization devices 510a,b not only synchronize video on the respective display devices of their own video wall 520a,b, but they also synchronize video across the respective video walls 520a,b.

Internally, each video synchronization device 510a,b synchronizes the clock and frames rates across its own display controllers using the approach shown and described in connection with FIG. 2 (e.g., a primary display controller sends clock/frame sync signals to secondary display controllers).

Externally, however, the video synchronization devices 510a,b synchronize their clock and frames rates remotely via network 530. In some embodiments, for example, the timing and synchronization functionality in the IEEE 802.1AS standard may be leveraged to synchronize the clock/frame rates across the respective video synchronization devices 510a,b and their corresponding video walls 520a,b. For example, one of the video synchronization devices 510a is configured as the primary timekeeper device (e.g., an IEEE 802.1AS "Grand Master") and the other(s) 510b are configured as secondaries. To synchronize the clock rate across the respective video synchronization devices 510a,b, the primary device 510a distributes a reference time to each secondary device 510b, and each secondary device 510b determines an offset between its own local timekeeper and the reference time distributed by the primary device 510a. In addition, the primary device 510a may also send timing information to synchronize the respective frame rates across the video sync devices 510a,b (e.g., such that each device 510a,b outputs the next set of frames on its respective video wall 520a,b at the same time).

In the illustrated embodiment, the video synchronization devices 510a,b are wirelessly connected to network 530. In other embodiments, however, each video synchronization devices 510a,b may be connected to network 530 via a wired and/or wireless communication medium.

Moreover, in some embodiments, the network 530 may include a high speed bridge or switch, such as one or more IEEE 802.1AS compliant network switches, to communicatively couple the respective video synchronization devices 510a,b.

Further, while the illustrated embodiment includes two video synchronization devices 510a,b that are used to control two display walls 520a,b with four displays each, other embodiments may include any number of video synchronization devices, displays walls, and/or display devices per wall.

Figure 6:
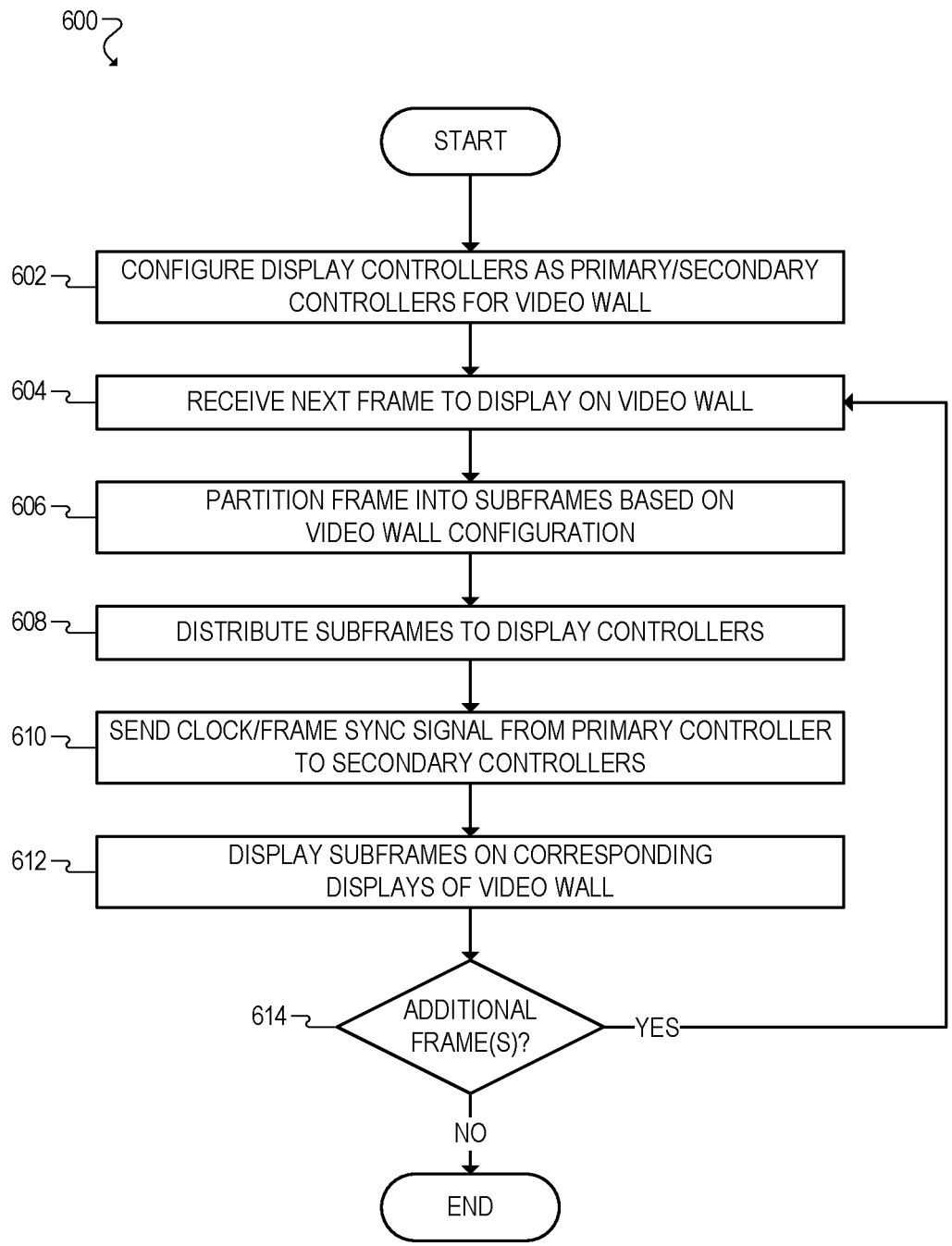
FIG. 6 illustrates a flowchart for synchronizing video across multiple displays in accordance with certain embodiments.

FIG. 6 illustrates a flowchart 600 for synchronizing video across multiple displays in accordance with certain embodiments. In some embodiments, flowchart 600 may be performed by or using the computing devices, systems, and environments described throughout this disclosure (e.g., the video synchronization devices of FIGS. 1-5, computing devices 1000, 1050 of FIGS. 10A-B).

In some embodiments, for example, flowchart 600 may be performed by one or more processing devices to synchronize video or other media content across multiple display devices configured as part of a video wall. Each processing device may include one or more display interfaces (e.g., to interface with one or more display devices in the video wall), one or more display controllers (e.g., to output video frames to the display device(s) via the display interface(s)), and display synchronization circuitry (e.g., internal/external display synchronization interfaces to synchronize clock/frame rates across the display controllers within each processing device and across the processing devices).

The display interface(s) may include any suitable types of display interfaces, such as high-definition multimedia interface (HDMI) interfaces, DisplayPort (DP) interfaces, type-C interfaces, and/or video graphics array (VGA) interfaces, among other examples.

Moreover, the display controller(s) may include physical layer (PHY) display controller(s) for the respective display interfaces, such as HDMI PHYs, DisplayPort PHYs, type-C PHYs, VGA PHYs, and so forth.

The display synchronization circuitry may include one or more internal and/or external display synchronization interfaces. For example, the internal display synchronization interfaces may include internal clock and frame synchronization interfaces, which are used to synchronize the clock rate and frame rate across the display controllers within an individual processing device. Similarly, the external display synchronization interfaces are used to synchronize the clock rate and frame rate across different processing devices.

In various embodiments, each processing device may also include a variety of other computing resources, such as a processor/CPU, memory, a storage device, and/or communication circuitry (e.g., input/output (I/O) circuitry, network interface controller (NIC) circuitry, antenna(s)), among other examples.

In some embodiments, each individual processing device may be implemented as a system-on-a-chip (SoC), a discrete graphics card, or a custom ASIC/FPGA video processor, among other examples. For example, an SoC may include a central processing unit (CPU) and an integrated graphics processing unit (GPU), and the integrated GPU may include the display controllers and the display synchronization circuitry. Similarly, a discrete graphics card may include a discrete GPU, and the discrete GPU may include the display controllers and the display synchronization circuitry. Alternatively, a custom ASIC/FPGA video processor may be designed with the display controllers and the display synchronization circuitry.

Moreover, some or all of the respective processing devices may be part of a broader system, such as a digital media player (e.g., video streaming device, disc-based media player as Blu-Ray or DVD), a video game console, an edge server, a display device (e.g., one of the display devices in the video wall, such as a television or monitor with an integrated processing device to participate in the video wall), a video wall controller (e.g., a physical case or housing with one or more processing devices to drive the displays of a video wall), a video wall itself (e.g., a collection of displays and the associated processing devices to drive the displays), among other examples.

Moreover, for a video wall use case, a video wall application can setup a primary system and set the others to secondary before starting the application. This triggers the internal logic in silicon to setup the display PHY clock to align with the primary display's clock. In this manner, all devices—including primary and secondaries—are now set up to flip frames simultaneously based on a frame synchronization signal (e.g., a vertical sync (VSync) signal) sent from the primary device. Further, a user can set up video zones for each display/system as part of the video wall application setup, which essentially starts the decode and rendering cycle on each device. The user only needs to perform setup on one system (which can become the primary for timing purposes). After setup is complete, the application may be transferred over Wi-Fi/Ethernet using TCP/IP to each of the secondary systems. Once the hardware timing sync is established, the video wall application starts the video decode and rendering process. Given that the vertical synchronization (vsync) occurs at the same time on all devices/systems, frames lined up to be rendered are shown at the same time on the display screens.

The flowchart begins at block 602, where the display controllers of one or more processing device(s) are configured to participate in a video wall. For example, if a processing device has multiple display controllers, one of them may be configured as the primary controller and the others may be configured as secondary controllers. If multiple processing devices are participating in the video wall, the primary controller may be configured on one of the processing devices, and all other display controllers—whether on the same processing device as the primary controller or one of the other processing devices—may be configured as secondary controllers.

The flowchart then proceeds to block 604 to receive a frame of a video stream to display on video wall (e.g., via a network interface, an input/output (I/O) interface, and/or other communication circuitry). For example, the frame may be received or obtained from a local storage device, another processing device participating in the video wall, a smart camera, an edge server, a centralized or cloud-based server (e.g., a content distribution server), and so forth.

The flowchart then proceeds to block 606 to partition the frame into multiple subframes based on the configuration or arrangement of the displays in the video wall. For example, if a single processing device is powering a video wall with four displays in a 2×2 arrangement, the frame may be spatially partitioned into four subframes in a 2×2 arrangement within the frame (e.g., such that the relative spatial position of each subframe within the frame corresponds to that of one of the displays in the video wall).

The flowchart then proceeds to block 608 to distribute the subframes to the corresponding display controllers (e.g., the primary and secondary display controllers). For example, each display controller may interface with one of the displays via a corresponding display interface. Thus, each subframe may be sent to the display controller corresponding to the particular display in the video wall where the subframe will be displayed.

If multiple processing devices are participating in the video wall, subframes corresponding to displays managed by other processing devices may be sent to those processing devices, which may then distribute the subframes to their corresponding display controllers.

The flowchart then proceeds to block 610, where the primary display controller sends clock and frame synchronization signals to the secondary display controllers.

For example, with respect to display controllers from the same processing device, the primary controller sends a clock synchronization signal to the secondary controller(s) via a clock synchronization interface, which is used to synchronize the clock rate across the respective display controllers of that processing device. For example, upon receiving the clock synchronization signal from the primary display controller, each secondary display controller may synchronize its internal clock with the internal clock of the primary display controller.

The primary controller also sends a frame synchronization signal to the secondary controller(s) via a frame synchronization interface, which is used to synchronize the frame rate across the respective display controllers of that processing device. For example, as described below in connection with block 612, the frame synchronization signal causes each of the display controllers to output or display their corresponding subframe to their corresponding display device at the same time. In some embodiments, for example, the frame synchronization signal may be, or may include, a vertical synchronization (VSync) signal.

Moreover, if multiple processing devices are participating in the video wall, the primary display controller also sends the clock and frame synchronization signals externally to the other processing devices via one or more external display synchronization interfaces, which enables the clock rate and frame rate to be synchronized across all processing devices participating in the video wall. For example, upon receiving the external clock and frame synchronization signals from the primary controller of one of the processing devices, the other processing devices propagate those synchronization signals to their respective secondary display controllers via their own internal clock and frame synchronization interfaces.

In some embodiments, the external display synchronization interface(s) may include one or more coaxial interfaces, which enables the processing devices to interface with each other and synchronize their respective clock and frame rates. For example, in some embodiments, the coaxial interface(s) may be Bayonet Neill Concelman (BNC) interfaces, and each processing device may have multiple BNC interfaces—an input BNC interface and an output BNC interface—each of which has at least two pins for the respective clock and frame synchronization signals. The input BNC interface enables the processing device to receive clock and frame synchronization signals from one of the other processing devices, while the output BNC interface enables the processing device to send the clock and frame synchronization signals to the other processing devices.

In other embodiments, however, any suitable type, number, and/or combination of external interfaces may be used to synchronize the clock and frame rate among the separate processing devices that are participating in the video wall.

The flowchart then proceeds to block 612, where—in response to the frame synchronization signal—the respective display controllers simultaneously output their corresponding subframes to the corresponding displays of the video wall. For example, based on the frame synchronization signal, the primary and secondary display controllers each output one of the subframes to their corresponding display device via their corresponding display interface. Thus, each display controller displays one of the subframes as a full video frame on one of the display devices. In this manner, all of the subframes are displayed on the respective display devices of the video wall at the same time.

The flowchart then proceeds to block 614 to determine whether to continue processing additional frame(s). For example, if the video stream contains additional frame(s) to display on the video wall, the flowchart repeats blocks 604-612 to receive, process, and display the next frame on the video wall. The flowchart continues in this manner until potentially determining there are no additional frame(s) to display.

At this point, the flowchart may be complete. In some embodiments, however, the flowchart may restart and/or certain blocks may be repeated. For example, in some embodiments, the flowchart may restart at block 602 to display another video (e.g., the same video or a new video) on the video wall.

Example Computing Environments

The following sections present examples of computing devices, platforms, systems, and environments that may be used to implement the video synchronization solution described throughout this disclosure.

Edge Computing Embodiments

Figure 7:
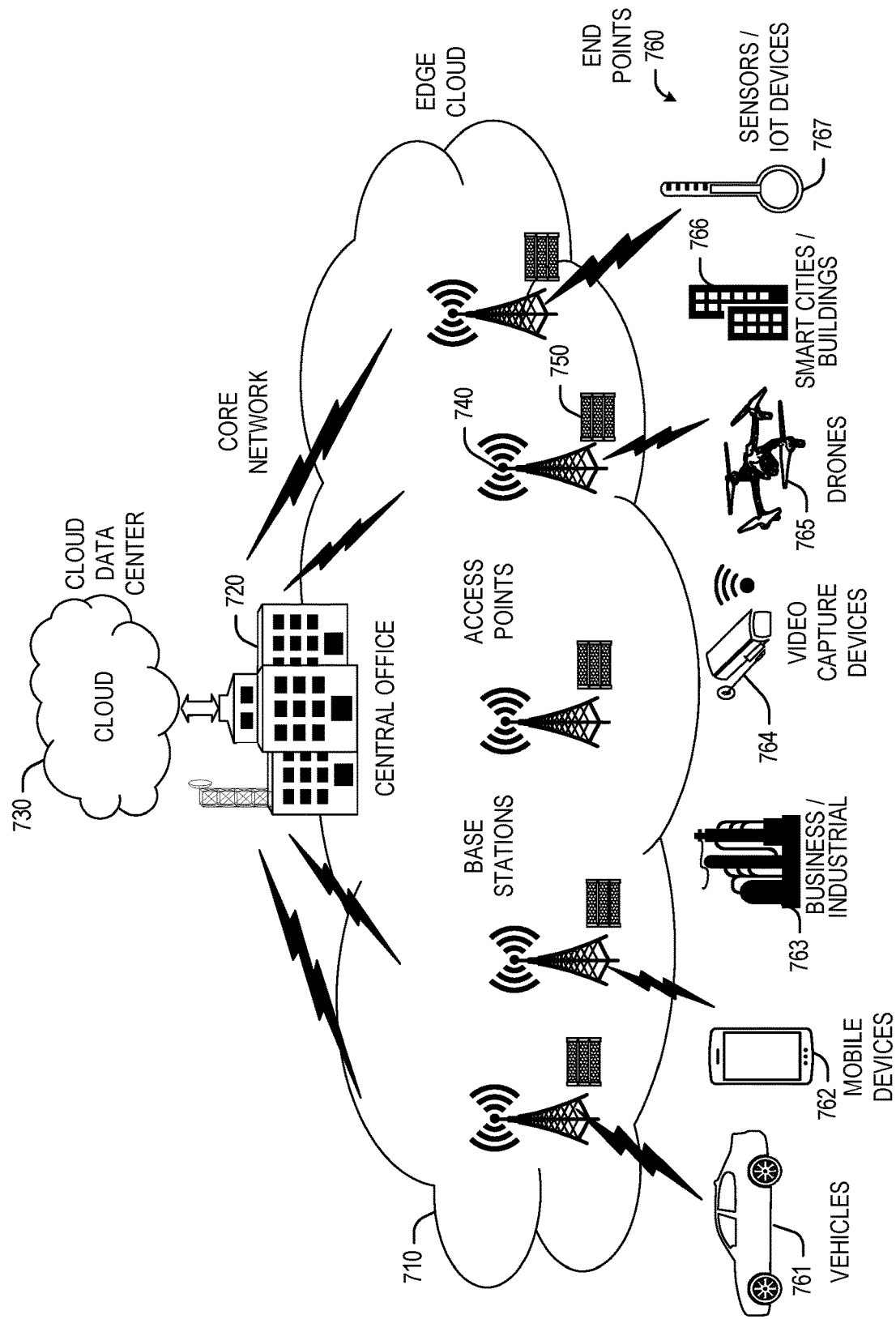
FIG. 7 illustrates an overview of an edge cloud configuration for edge computing.

FIG. 7 is a block diagram 700 showing an overview of a configuration for edge computing, which includes a layer of processing referred to in many of the following examples as an "edge cloud". As shown, the edge cloud 710 is co-located at an edge location, such as an access point or base station 740, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the edge cloud 710 are critical to providing ultra-low latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 8:
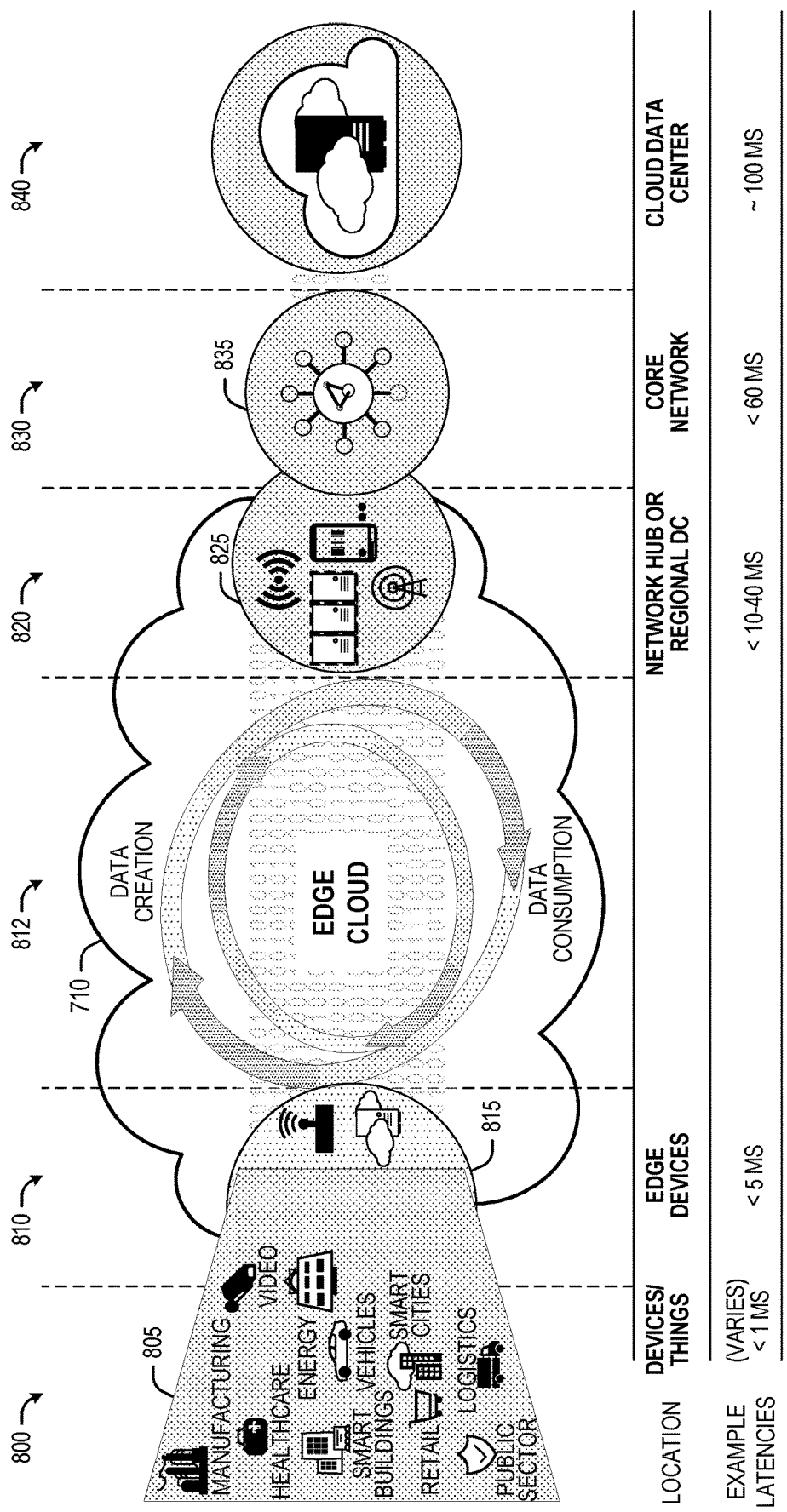
FIG. 8 illustrates operational layers among endpoints, an edge cloud, and cloud computing environments.

FIG. 8 illustrates operational layers among endpoints, an edge cloud, and cloud computing environments. Specifically, FIG. 8 depicts examples of computational use cases 805, utilizing the edge cloud 710 among multiple illustrative layers of network computing. The layers begin at an endpoint (devices and things) layer 800, which accesses the edge cloud 710 to conduct data creation, analysis, and data consumption activities. The edge cloud 710 may span multiple network layers, such as an edge devices layer 810 having gateways, on-premise servers, or network equipment (nodes 815) located in physically proximate edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the edge cloud 710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 800, under 5 ms at the edge devices layer 810, to even between 10 to 40 ms when communicating with nodes at the network access layer 820. Beyond the edge cloud 710 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 835 or a cloud data center 845, a central office or content data network may be considered as being located within a "near edge" layer ("near" to the cloud, having high latency values when communicating with the devices and endpoints of the use cases 805), whereas an access point, base station, on-premise server, or network gateway may be considered as located within a "far edge" layer ("far" from the cloud, having low latency values when communicating with the devices and endpoints of the use cases 805). It will be understood that other categorizations of a particular network layer as constituting a "close", "local", "near", "middle", or "far" edge may be based on latency, distance, number of network hops, or other measurable characteristics, as measured from a source in any of the network layers 800-840.

The various use cases 805 may access resources under usage pressure from incoming streams, due to multiple services utilizing the edge cloud. To achieve results with low latency, the services executed within the edge cloud 710 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 710 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 710 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 710 (network layers 800-840), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 710.

As such, the edge cloud 710 is formed from network components and functional features operated by and within edge gateway nodes, edge aggregation nodes, or other edge compute nodes among network layers 810-830. The edge cloud 710 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 710 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 710 may be servers, multi-tenant servers, appliance computing devices, and/or any other type of computing devices. For example, the edge cloud 710 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 10B. The edge cloud 710 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 9:
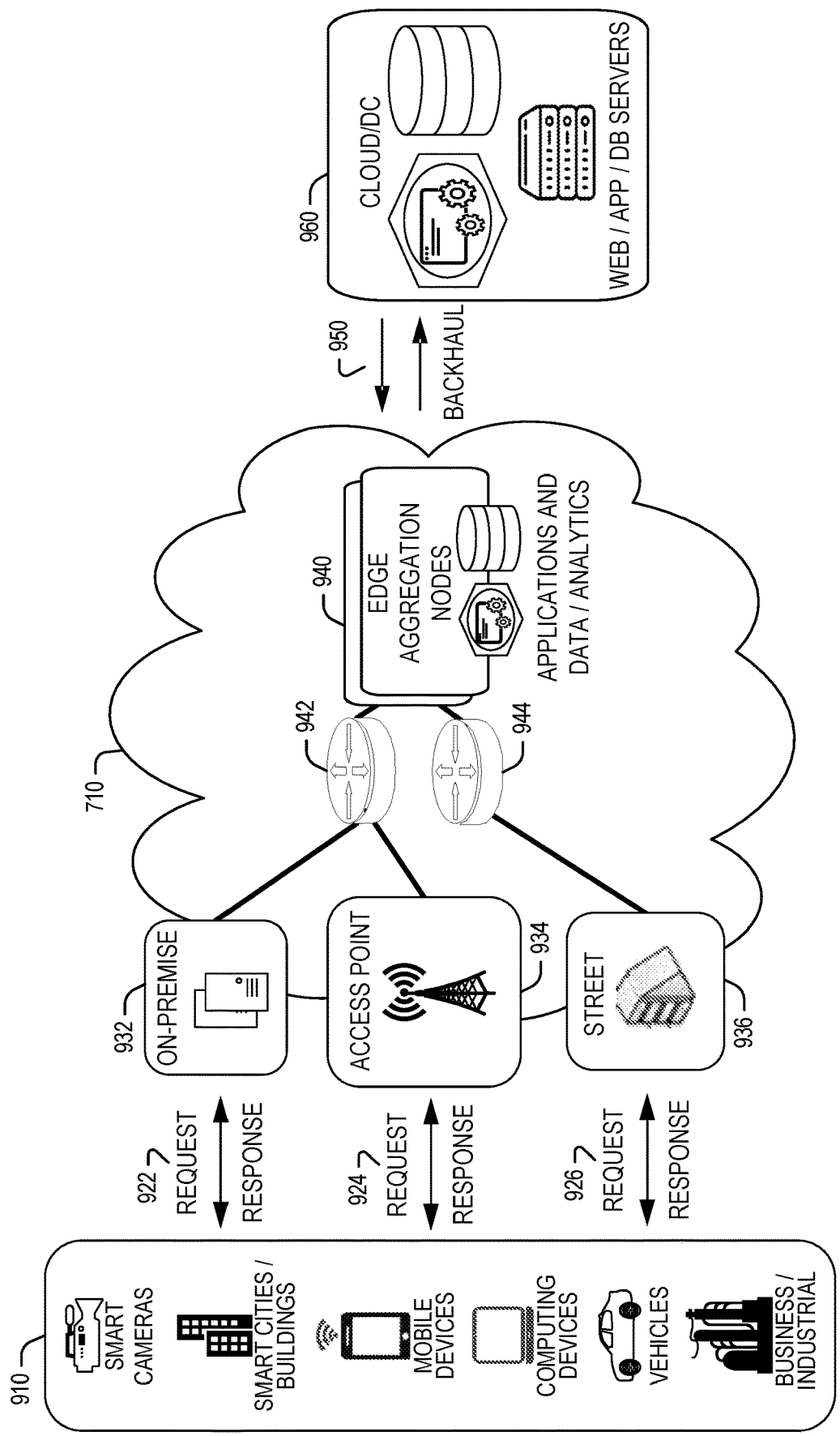
FIG. 9 illustrates an example approach for networking and services in an edge computing system.

In FIG. 9, various client endpoints 910 (in the form of smart cameras, mobile devices, computers, autonomous vehicles, business computing equipment, industrial processing equipment) exchange requests and responses that are specific to the type of endpoint network aggregation. For instance, client endpoints 910 may obtain network access via a wired broadband network, by exchanging requests and responses 922 through an on-premise network system 932. Some client endpoints 910, such as smart cameras, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the edge cloud 710 to aggregate traffic and requests. Thus, within the edge cloud 710, the TSP may deploy various compute and storage resources, such as at edge aggregation nodes 940, to provide requested content. The edge aggregation nodes 940 and other systems of the edge cloud 710 are connected to a cloud or data center 960, which uses a backhaul network 950 to fulfill higher-latency requests from a cloud/data center for websites, applications, database servers, etc. Additional or consolidated instances of the edge aggregation nodes 940 and the aggregation points 942, 944, including those deployed on a single server framework, may also be present within the edge cloud 710 or other areas of the TSP infrastructure.

Computing Devices and Systems

In further examples, any of the compute nodes or devices discussed with reference to the present edge computing systems and environment may be fulfilled based on the components depicted in FIGS. 10A-B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 10A:
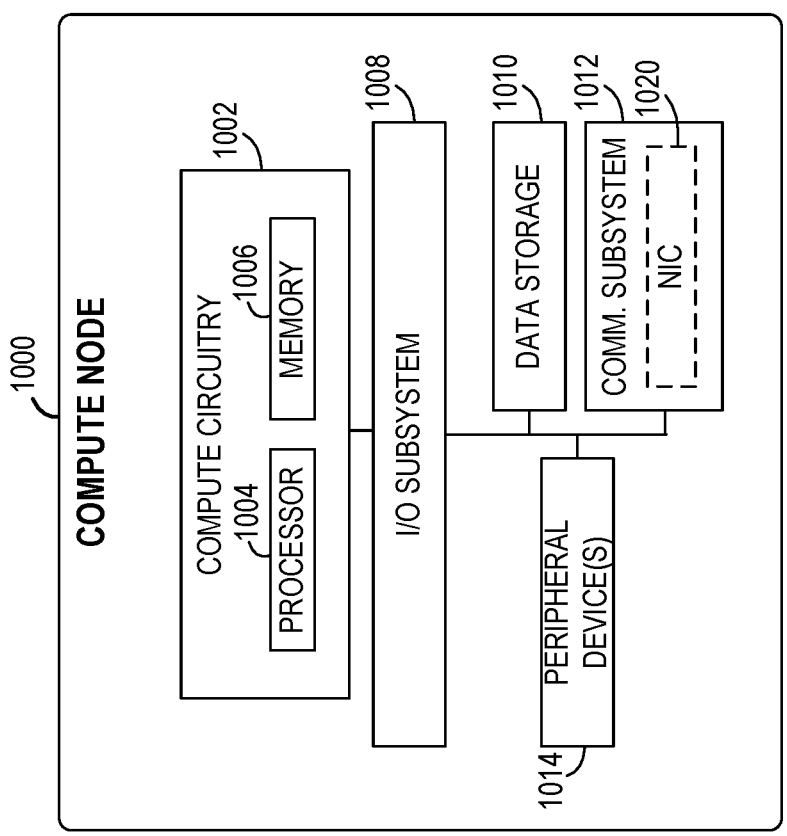
FIG. 10A provides an overview of example components for compute deployed at a compute node in an edge computing system.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, a processing unit, a specialized or special purpose processing unit, or other processor or processing/controlling circuit.

In some examples, the processor 1004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1004 may work in coordination with each other to execute many types of operations and instructions within and on behalf of the compute node 1000.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., an edge gateway of an implementing edge computing system). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., an edge gateway node). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, and/or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective edge compute node (whether a client, gateway, or aggregation node) in an edge computing system or like forms of appliances, computers, subsystems, circuitry, or other components.

Figure 10B:
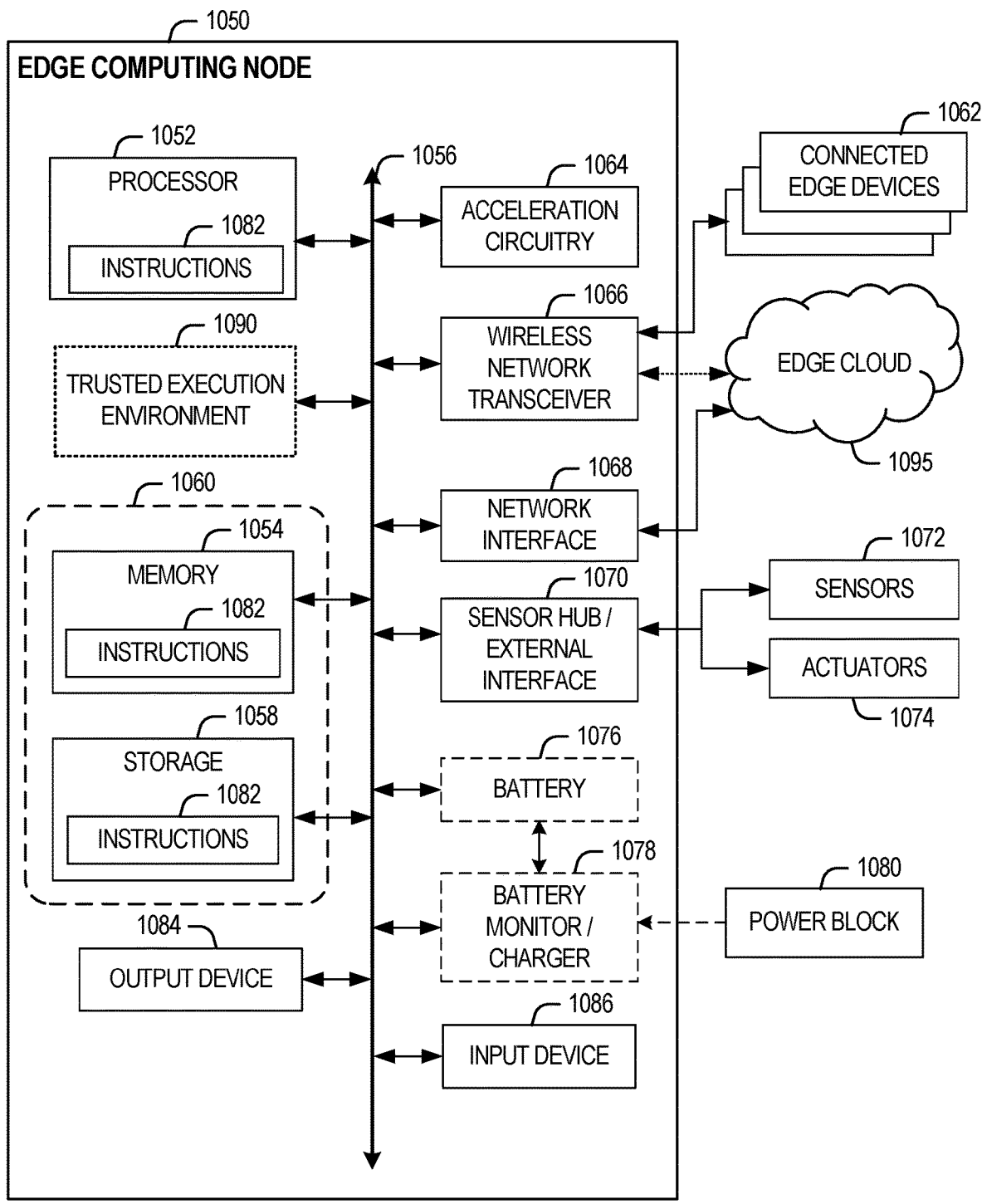
FIG. 10B provides a further overview of example components within a computing device in an edge computing system.

In a more detailed example, FIG. 10B illustrates a block diagram of an example of components that may be present in an edge computing node 1050 for implementing the techniques (e.g., operations, processes, methods, and methodologies) described herein. This edge computing node 1050 provides a closer view of the respective components of node 1000 when implemented as or as part of a computing device (e.g., as a mobile device, a base station, server, gateway, etc.). The edge computing node 1050 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1050, or as components otherwise incorporated within a chassis of a larger system.

The edge computing device 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on Bluetooth Low Energy (BLE), or another low power radio, to save power. More distant connected edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in a cloud (e.g., an edge cloud 1095) via local or wide area network protocols. The wireless network transceiver 1066 may be a low-power wide-area (LPWA) transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1095 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1050. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1076 may power the edge computing node 1050, although, in examples in which the edge computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

Software Distribution

Figure 11:
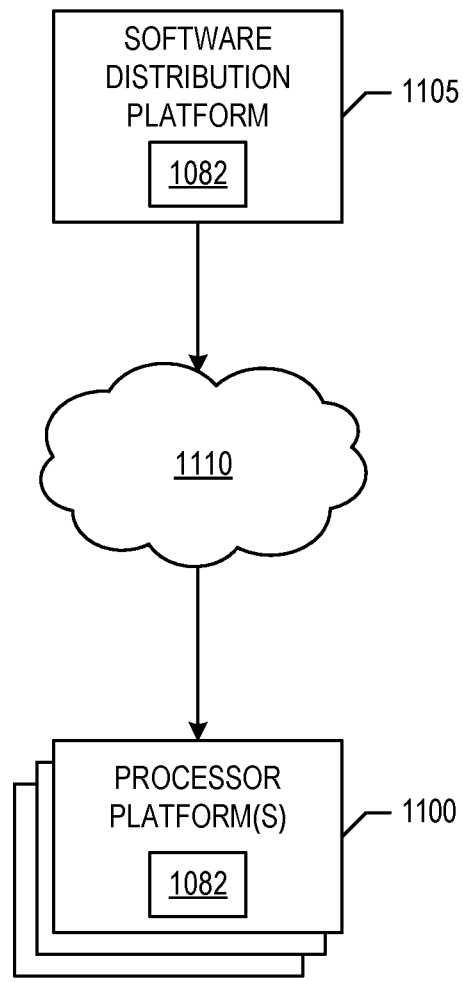
FIG. 11 illustrates an example software distribution platform to distribute software.

FIG. 11 illustrates an example software distribution platform 1105 to distribute software, such as the example computer readable instructions 1082 of FIG. 10B, to one or more devices, such as example processor platform(s) 1100 and/or example connected edge devices described throughout this disclosure. The example software distribution platform 1105 may be implemented by any computer server, data facility, cloud service, etc., capable of storing and transmitting software to other computing devices (e.g., third parties, example connected edge devices described throughout this disclosure). Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer readable instructions 1082 of FIG. 10B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 11, the software distribution platform 1105 includes one or more servers and one or more storage devices. The storage devices store the computer readable instructions 1082, which may implement the video synchronization functionality described throughout this disclosure. The one or more servers of the example software distribution platform 1105 are in communication with a network 1110, which may correspond to any one or more of the Internet and/or any of the example networks described throughout this disclosure. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1082 from the software distribution platform 1105. For example, software comprising the computer readable instructions 1082 may be downloaded to the example processor platform(s) 1100 (e.g., example connected edge devices), which is/are to execute the computer readable instructions 1082 to implement the functionality described throughout this disclosure. In some examples, one or more servers of the software distribution platform 1105 are communicatively connected to one or more security domains and/or security devices through which requests and transmissions of the example computer readable instructions 1082 must pass. In some examples, one or more servers of the software distribution platform 1105 periodically offer, transmit, and/or force updates to the software (e.g., the example computer readable instructions 1082 of FIG. 10B) to ensure improvements, patches, updates, etc. are distributed and applied to the software at the end user devices.

In the illustrated example of FIG. 11, the computer readable instructions 1082 are stored on storage devices of the software distribution platform 1105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1082 stored in the software distribution platform 1105 are in a first format when transmitted to the example processor platform(s) 1100. In some examples, the first format is an executable binary in which particular types of the processor platform(s) 1100 can execute. However, in some examples, the first format is uncompiled code that requires one or more preparation tasks to transform the first format to a second format to enable execution on the example processor platform(s) 1100. For instance, the receiving processor platform(s) 1100 may need to compile the computer readable instructions 1082 in the first format to generate executable code in a second format that is capable of being executed on the processor platform(s) 1100. In still other examples, the first format is interpreted code that, upon reaching the processor platform(s) 1100, is interpreted by an interpreter to facilitate execution of instructions.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

EXAMPLES

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes a processing device, comprising: a plurality of display interfaces, wherein the plurality of display interfaces are to interface with a plurality of display devices; a plurality of display controllers, wherein the plurality of display controllers are to output video frames to the plurality of display devices via the plurality of display interfaces; and display synchronization circuitry, comprising: a clock synchronization interface to synchronize a clock rate across the plurality of display controllers; and a frame synchronization interface to synchronize a frame rate across the plurality of display controllers.

Example 2 includes the processing device of Example 1, wherein the display synchronization circuitry further comprises circuitry to: configure the plurality of display controllers as a primary display controller and one or more secondary display controllers.

Example 3 includes the processing device of Example 2, wherein: the primary display controller is to send, via the clock synchronization interface, a clock synchronization signal to the one or more secondary display controllers, wherein the clock synchronization signal is to synchronize the clock rate across the primary display controller and the one or more secondary display controllers; and the one or more secondary display controllers are to receive, via the clock synchronization interface, the clock synchronization signal from the primary display controller.

Example 4 includes the processing device of Example 3, wherein the one or more secondary display controllers to receive, via the clock synchronization interface, the clock synchronization signal from the primary display controller are further to: synchronize, based on the clock synchronization signal, an internal clock of each of the one or more secondary display controllers with an internal clock of the primary display controller.

Example 5 includes the processing device of any of Examples 2-4, wherein: the primary display controller is to send, via the frame synchronization interface, a frame synchronization signal to the one or more secondary display controllers, wherein the frame synchronization signal is to synchronize output of a plurality of video frames across the primary display controller and the one or more secondary display controllers; the one or more secondary display controllers are to receive, via the frame synchronization interface, the frame synchronization signal from the primary display controller; and based on the frame synchronization signal, the primary display controller and the one or more secondary display controllers are further to output the plurality of video frames to the plurality of display devices via the plurality of display interfaces, wherein each of the primary display controller and the one or more secondary display controllers is to output one of the plurality of video frames to one of the plurality of display devices via one of the plurality of display interfaces.

Example 6 includes the processing device of Example 5, wherein the frame synchronization signal comprises a vertical synchronization (VSync) signal.

Example 7 includes the processing device of any of Examples 1-6, wherein the display synchronization circuitry further comprises: one or more external display synchronization interfaces, wherein the one or more external display synchronization interfaces are to synchronize the clock rate and the frame rate across the processing device and one or more second processing devices, wherein the one or more second processing devices interface with one or more second display devices.

Example 8 includes the processing device of Example 7, wherein the one or more external display synchronization interfaces comprise one or more coaxial interfaces, wherein the one or more coaxial interfaces are to interface with the one or more second processing devices.

Example 9 includes the processing device of Example 8, wherein the one or more coaxial interfaces comprise one or more Bayonet Neill Concelman (BNC) interfaces.

Example 10 includes the processing device of Example 9, wherein the one or more BNC interfaces comprise: a first BNC interface to send a clock synchronization signal and a frame synchronization signal to the one or more second processing devices, wherein the clock synchronization signal is to synchronize the clock rate across the processing device and the one or more second processing devices, and wherein the frame synchronization signal is to synchronize the frame rate across the processing device and the one or more second processing devices; and a second BNC interface to receive the clock synchronization signal and the frame synchronization signal from the one or more second processing devices.

Example 11 includes the processing device of any of Examples 1-10, wherein the plurality of display controllers comprises a plurality of physical layer (PHY) display controllers.

Example 12 includes the processing device of any of Examples 1-11, wherein the plurality of display interfaces comprises: one or more high-definition multimedia interface (HDMI) interfaces; one or more display port (DP) interfaces; one or more type-C interfaces; or one or more video graphics array (VGA) interfaces.

Example 13 includes the processing device of any of Examples 1-12, wherein the processing device is: a system-on-a-chip (SoC), wherein the SoC comprises a central processing unit (CPU) and an integrated graphics processing unit (GPU), wherein the integrated GPU comprises the plurality of display controllers; a discrete graphics card, wherein the discrete graphics card comprises a discrete GPU, wherein the discrete GPU comprises the plurality of display controllers; a field-programmable gate array (FPGA), wherein the FPGA comprises the one or more display controllers; a media player; a video game console; a video wall controller; or an edge server.

Example 14 includes the processing device of any of Examples 1-13, wherein the plurality of display devices are configured as a video wall.

Example 15 includes a system, comprising: a plurality of processing devices to interface with a plurality of display devices, wherein each processing device of the plurality of processing devices comprises: one or more display interfaces, wherein the one or more display interfaces are to interface with one or more display devices of the plurality of display devices; one or more display controllers, wherein the one or more display controllers are to output video frames to the one or more display devices via the one or more display interfaces; and one or more external display synchronization interfaces, wherein the one or more external display synchronization interfaces are to synchronize a clock rate and a frame rate across the plurality of processing devices.

Example 16 includes the system of Example 15, wherein: the one or more display interfaces comprise a plurality of display interfaces; the one or more display controllers comprise a plurality of display controllers; and each processing device of the plurality of processing devices comprises further comprises display synchronization circuitry, wherein the display synchronization circuitry comprises: the one or more external display synchronization interfaces; and one or more internal display synchronization interfaces, wherein the one or more internal display synchronization interfaces are to synchronize the clock rate and the frame rate across the plurality of display controllers.

Example 17 includes the system of any of Examples 15-16, wherein the plurality of display devices are configured as a video wall.

Example 18 includes the system of Example 17, further comprising: communication circuitry to receive video frames to be displayed on the video wall; and processing circuitry to: receive, via the communication circuitry, a video frame to be displayed on the video wall; partition the video frame into a plurality of subframes; and distribute the plurality of subframes to the plurality of processing devices, wherein the plurality of processing devices are to cause the plurality of subframes to be displayed on the plurality of display devices.

Example 19 includes the system of any of Examples 15-18, wherein each processing device of the plurality of processing devices is: a system-on-a-chip (SoC), wherein the SoC comprises a central processing unit (CPU) and an integrated graphics processing unit (GPU), wherein the integrated GPU comprises the one or more display controllers; a discrete graphics card, wherein the discrete graphics card comprises a discrete GPU, wherein the discrete GPU comprises the one or more display controllers; or a field-programmable gate array (FPGA), wherein the FPGA comprises the one or more display controllers.

Example 20 includes the system of any of Examples 15-19, wherein the system is: a video wall controller; a video wall, wherein the video wall further comprises the plurality of display devices; an edge server; a media player; or a video game console.

Example 21 includes at least one non-transitory machine-readable storage medium having instructions stored thereon, wherein the instructions, when executed on a processing device comprising a plurality of display controllers, cause the processing device to: configure the plurality of display controllers as a primary display controller and one or more secondary display controllers; send, via a clock synchronization interface, a clock synchronization signal from the primary display controller to the one or more secondary display controllers, wherein the clock synchronization signal is to synchronize a clock rate across the primary display controller and the one or more secondary display controllers; send, via a frame synchronization interface, a frame synchronization signal from the primary display controller to the one or more secondary display controllers, wherein the frame synchronization signal is to synchronize a frame rate across the primary display controller and the one or more secondary display controllers; and output, based on the frame synchronization signal, a plurality of video frames to a plurality of display devices via a plurality of display interfaces, wherein each of the primary display controller and the one or more secondary display controllers is to output one of the plurality of video frames to one of the plurality of display devices via one of the plurality of display interfaces.

Example 22 includes the storage medium of Example 21, wherein the instructions further cause the processing device to: send, via one or more external display synchronization interfaces, the clock synchronization signal and the frame synchronization signal to one or more second processing devices, wherein the one or more second processing devices interface with one or more second display devices, and wherein: the clock synchronization signal is to synchronize the clock rate across the processing device and the one or more second processing devices; and the frame synchronization signal is to synchronize the frame rate across the processing device and the one or more second processing devices.

Example 23 includes the storage medium of any of Examples 21-22, wherein the instructions further cause the processing device to: receive a video frame to be displayed on a video wall, wherein the video wall comprises the plurality of display devices; partition the video frame into the plurality of video frames; and distribute the plurality of video frames across the primary display controller and the one or more secondary display controllers, wherein each of the primary display controller and the one or more secondary display controllers is to output one of the plurality of video frames to one of the plurality of display devices via one of the plurality of display interfaces.

Example 24 includes a method performed by a processing device to synchronize video content displayed across a plurality of display devices, wherein the method comprises: configuring a plurality of display controllers of the processing device as a primary display controller and one or more secondary display controllers; sending, via a clock synchronization interface, a clock synchronization signal from the primary display controller to the one or more secondary display controllers, wherein the clock synchronization signal is to synchronize a clock rate across the primary display controller and the one or more secondary display controllers; sending, via a frame synchronization interface, a frame synchronization signal from the primary display controller to the one or more secondary display controllers, wherein the frame synchronization signal is to synchronize a frame rate across the primary display controller and the one or more secondary display controllers; and outputting, based on the frame synchronization signal, a plurality of video frames to the plurality of display devices via a plurality of display interfaces, wherein each of the primary display controller and the one or more secondary display controllers is to output one of the plurality of video frames to one of the plurality of display devices via one of the plurality of display interfaces.

Example 25 includes the method of Example 24, further comprising: sending, via one or more external display synchronization interfaces, the clock synchronization signal and the frame synchronization signal to one or more second processing devices, wherein the one or more second processing devices interface with one or more second display devices, and wherein: the clock synchronization signal is to synchronize the clock rate across the processing device and the one or more second processing devices; and the frame synchronization signal is to synchronize the frame rate across the processing device and the one or more second processing devices.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A processing device, comprising:
a plurality of display interfaces, wherein the plurality of display interfaces are to interface with a plurality of display devices;
a plurality of display controllers, wherein the plurality of display controllers are to output video frames to the plurality of display devices via the plurality of display interfaces; and
display synchronization circuitry, comprising:
a clock synchronization interface to synchronize a clock rate across the plurality of display controllers; and
a frame synchronization interface to synchronize a frame rate across the plurality of display controllers.

2. The processing device of claim 1, wherein the display synchronization circuitry further comprises circuitry to:
configure the plurality of display controllers as a primary display controller and one or more secondary display controllers.

3. The processing device of claim 2, wherein:
the primary display controller is to send, via the clock synchronization interface, a clock synchronization signal to the one or more secondary display controllers, wherein the clock synchronization signal is to synchronize the clock rate across the primary display controller and the one or more secondary display controllers; and
the one or more secondary display controllers are to receive, via the clock synchronization interface, the clock synchronization signal from the primary display controller.

4. The processing device of claim 3, wherein the one or more secondary display controllers to receive, via the clock synchronization interface, the clock synchronization signal from the primary display controller are further to:
synchronize, based on the clock synchronization signal, an internal clock of each of the one or more secondary display controllers with an internal clock of the primary display controller.

5. The processing device of claim 2, wherein:
the primary display controller is to send, via the frame synchronization interface, a frame synchronization signal to the one or more secondary display controllers, wherein the frame synchronization signal is to synchronize output of a plurality of video frames across the primary display controller and the one or more secondary display controllers;

the one or more secondary display controllers are to receive, via the frame synchronization interface, the frame synchronization signal from the primary display controller; and based on the frame synchronization signal, the primary display controller and the one or more secondary display controllers are further to output the plurality of video frames to the plurality of display devices via the plurality of display interfaces, wherein each of the primary display controller and the one or more secondary display controllers is to output one of the plurality of video frames to one of the plurality of display devices via one of the plurality of display interfaces.

6. The processing device of claim 5, wherein the frame synchronization signal comprises a vertical synchronization (VSync) signal.

7. The processing device of claim 1, wherein the display synchronization circuitry further comprises:

one or more external display synchronization interfaces, wherein the one or more external display synchronization interfaces are to synchronize the clock rate and the frame rate across the processing device and one or more second processing devices, wherein the one or more second processing devices interface with one or more second display devices.

8. The processing device of claim 7, wherein the one or more external display synchronization interfaces comprise one or more coaxial interfaces, wherein the one or more coaxial interfaces are to interface with the one or more second processing devices.

9. The processing device of claim 8, wherein the one or more coaxial interfaces comprise one or more Bayonet Neill Concelman (BNC) interfaces.

10. The processing device of claim 9, wherein the one or more BNC interfaces comprise:

a first BNC interface to send a clock synchronization signal and a frame synchronization signal to the one or more second processing devices, wherein the clock synchronization signal is to synchronize the clock rate across the processing device and the one or more second processing devices, and wherein the frame synchronization signal is to synchronize the frame rate across the processing device and the one or more second processing devices; and a second BNC interface to receive the clock synchronization signal and the frame synchronization signal from the one or more second processing devices.

11. The processing device of claim 1, wherein the plurality of display controllers comprises a plurality of physical layer (PHY) display controllers.

12. The processing device of claim 1, wherein the plurality of display interfaces comprises:

one or more high-definition multimedia interface (HDMI) interfaces;

one or more display port (DP) interfaces;

one or more type-C interfaces; or one or more video graphics array (VGA) interfaces.

13. The processing device of claim 1, wherein the processing device is:

a system-on-a-chip (SoC), wherein the SoC comprises a central processing unit (CPU) and an integrated graphics processing unit (GPU), wherein the integrated GPU comprises the plurality of display controllers;

a discrete graphics card, wherein the discrete graphics card comprises a discrete GPU, wherein the discrete GPU comprises the plurality of display controllers;

a field-programmable gate array (FPGA), wherein the FPGA comprises the one or more display controllers;

a media player;

a video game console;

a video wall controller; or an edge server.

14. The processing device of claim 1, wherein the plurality of display devices are configured as a video wall.

15. A system, comprising:

a plurality of processing devices to interface with a plurality of display devices, wherein each processing device of the plurality of processing devices comprises:

one or more display interfaces, wherein the one or more display interfaces are to interface with one or more display devices of the plurality of display devices;

one or more display controllers, wherein the one or more display controllers are to output video frames to the one or more display devices via the one or more display interfaces; and one or more external display synchronization interfaces, wherein the one or more external display synchronization interfaces are to synchronize a clock rate and a frame rate across the plurality of processing devices.

16. The system of claim 15, wherein:

the one or more display interfaces comprise a plurality of display interfaces;

the one or more display controllers comprise a plurality of display controllers; and each processing device of the plurality of processing devices comprises further comprises display synchronization circuitry, wherein the display synchronization circuitry comprises:

the one or more external display synchronization interfaces; and one or more internal display synchronization interfaces, wherein the one or more internal display synchronization interfaces are to synchronize the clock rate and the frame rate across the plurality of display controllers.

17. The system of claim 15, wherein the plurality of display devices are configured as a video wall.

18. The system of claim 17, further comprising:

communication circuitry to receive video frames to be displayed on the video wall; and processing circuitry to:

receive, via the communication circuitry, a video frame to be displayed on the video wall;

partition the video frame into a plurality of subframes; and distribute the plurality of subframes to the plurality of processing devices, wherein the plurality of processing devices are to cause the plurality of subframes to be displayed on the plurality of display devices.

19. The system of claim 15, wherein each processing device of the plurality of processing devices is:

a system-on-a-chip (SoC), wherein the SoC comprises a central processing unit (CPU) and an integrated graphics processing unit (GPU), wherein the integrated GPU comprises the one or more display controllers;

a discrete graphics card, wherein the discrete graphics card comprises a discrete GPU, wherein the discrete GPU comprises the one or more display controllers; or a field-programmable gate array (FPGA), wherein the FPGA comprises the one or more display controllers.

20. The system of claim 15, wherein the system is:
a video wall controller;
a video wall, wherein the video wall further comprises the plurality of display devices;
an edge server;
a media player; or
a video game console.

21. At least one non-transitory machine-readable storage medium having instructions stored thereon, wherein the instructions, when executed on a processing device comprising a plurality of display controllers, cause the processing device to:
configure the plurality of display controllers as a primary display controller and one or more secondary display controllers;
send, via a clock synchronization interface, a clock synchronization signal from the primary display controller to the one or more secondary display controllers, wherein the clock synchronization signal is to synchronize a clock rate across the primary display controller and the one or more secondary display controllers;
send, via a frame synchronization interface, a frame synchronization signal from the primary display controller to the one or more secondary display controllers, wherein the frame synchronization signal is to synchronize a frame rate across the primary display controller and the one or more secondary display controllers; and
output, based on the frame synchronization signal, a plurality of video frames to a plurality of display devices via a plurality of display interfaces, wherein each video frame is output to a corresponding display device via a corresponding display interface by a corresponding display controller.

22. The storage medium of claim 21, wherein the instructions further cause the processing device to:
send, via one or more external display synchronization interfaces, the clock synchronization signal and the frame synchronization signal to one or more second processing devices, wherein the one or more second processing devices interface with one or more second display devices, and wherein:
the clock synchronization signal is to synchronize the clock rate across the processing device and the one or more second processing devices; and
the frame synchronization signal is to synchronize the frame rate across the processing device and the one or more second processing devices.

23. The storage medium of claim 21, wherein the instructions further cause the processing device to:
receive a video frame to be displayed on a video wall, wherein the video wall comprises the plurality of display devices;
partition the video frame into the plurality of video frames; and
distribute the plurality of video frames across the primary display controller and the one or more secondary display controllers, wherein each of the primary display controller and the one or more secondary display controllers is to output one of the plurality of video frames to one of the plurality of display devices via one of the plurality of display interfaces.

24. A method performed by a processing device to synchronize video content displayed across a plurality of display devices, wherein the method comprises:
configuring a plurality of display controllers of the processing device as a primary display controller and one or more secondary display controllers;
sending, via a clock synchronization interface, a clock synchronization signal from the primary display controller to the one or more secondary display controllers, wherein the clock synchronization signal is to synchronize a clock rate across the primary display controller and the one or more secondary display controllers;
sending, via a frame synchronization interface, a frame synchronization signal from the primary display controller to the one or more secondary display controllers, wherein the frame synchronization signal is to synchronize a frame rate across the primary display controller and the one or more secondary display controllers; and
outputting, based on the frame synchronization signal, a plurality of video frames to the plurality of display devices via a plurality of display interfaces, wherein each video frame is output to a corresponding display device via a corresponding display interface by a corresponding display controller.

25. The method of claim 24, further comprising:
sending, via one or more external display synchronization interfaces, the clock synchronization signal and the frame synchronization signal to one or more second processing devices, wherein the one or more second processing devices interface with one or more second display devices, and wherein:
the clock synchronization signal is to synchronize the clock rate across the processing device and the one or more second processing devices; and
the frame synchronization signal is to synchronize the frame rate across the processing device and the one or more second processing devices.

* * * * *